Sept. 16, 1952 G. W. FYLER ET AL 2,611,106

TELEVISION SWEEP SYSTEM

Filed July 20, 1949 2 SHEETS—SHEET 1

INVENTOR.
George W. Fyler
BY Robert M. Crooker
Foorman L. Mueller
Attys.

Sept. 16, 1952 G. W. FYLER ET AL 2,611,106

TELEVISION SWEEP SYSTEM

Filed July 20, 1949 2 SHEETS—SHEET 2

INVENTOR.
George W. Fyler
Robert M. Crooker
BY Foorman L. Mueller
Attys.

Patented Sept. 16, 1952 2,611,106

UNITED STATES PATENT OFFICE 2,611,106

TELEVISION SWEEP SYSTEM

George W. Fyler, Lombard, and Robert M. Crooker, Chicago, Ill., assignors to Motorola, Inc., Chicago, Ill., a corporation of Illinois Application July 20, 1949, Serial No. 105,844

16 Claims. (Cl. 315—27)

This invention relates to sweep systems for television picture tubes of the electromagnetic type, and particularly to sweep systems which serve also as high voltage sources for the picture tubes.

An electromagnetic picture tube utilizes electromagnetic deflection coils for causing the electron beam of the tube to sweep horizontally and vertically across the viewing screen. The horizontal sweep occurs at an extremely rapid rate, with each sweep of the beam tracing a horizontal line of the picture that is being displayed on the viewing screen. During each forward sweep, energy is stored mainly in the magnetic field of the horizontal deflection coils and also to some extent in the circuit inductances associated therewith, and during the return sweep (or retrace) which precedes the next horizontal line of the picture, this energy is released. The released energy may be used advantageously to provide a direct-current voltage of a very high magnitude for charging the high-voltage anode of the picture tube to its proper operating potential, thereby saving the cost of a separate high voltage power supply for this purpose.

In conventionally designed horizontal sweep systems, the horizontal deflection coils are indirectly coupled to the output electrodes of the horizontal sawtooth generator or power tube through the medium of a transformer, with the deflection coils being connected to the secondary winding of the transformer, and the primary winding of this transformer being connected into the plate circuit of the power tube. In this way the deflection coils are coupled electromagnetically to the power tube but are otherwise isolated therefrom. This sweep system, as mentioned above, may be used also to generate direct-current voltage of a high value.

Indirectly coupled sweep systems are not very efficient, principally because of the magnetic leakage that occurs in the transformer between the primary and secondary windings thereof. A relatively heavy plate current must be drawn by the power tube in order to insure both and adequate amount of horizontal sweep and a sufficiently high output voltage. This complicates the design of the apparatus and makes the cost of the transformer and power tube quite high. Because of the design problems which are involved, some manufacturers have discarded the combination sweep systems and high voltage power supply in favor of a power supply which is independent of the sweep system. Such an arrangement, while it presents fewer design difficulties, is even more expensive than the combination sweep and high voltage system.

Undesirable leakage effects may be avoided by resorting to a directly coupled sweep system in which the deflection coils are coupled directly to the power tube, and in place of a transformer there is provided a plate choke which affords an inductive load shunting the deflection coils. In such a system, however, the distributed capacitance and power loss of the choke are apt to be very troublesome factors, especially if the choke is used as part of the high voltage power supply. The portion of the choke inductance which shunts the deflection coils must be sufficiently high to insure adequate horizontal sweep. For example, if the deflection coils have an inductance of 40 millihenries, the part of the choke which is in shunt therewith has been chosen to be about 100 millihenries of inductance for a full 10-inch sweep, when a power tube of the ordinary receiving type is being used for sweeping. As a general rule, a choke having a high inductance is also likely to have a relatively high distributed capacitance and high power losses. This situation is aggravated if the choke is used to obtain high voltage with low direct-current plate voltage, because then a high step-up transformation ratio must be employed (the choke being arranged as an auto-transformer), thus increasing by several times the effective capacitance and the power losses of the choke as reflected into the plate circuit of the power tube. On the other hand, if the choke is to be employed successfully in a directly coupled sweep system, its stray capacitance and power losses must be low. In order to convert the stored inductive energy ($\frac{1}{2}LI^2$) into capacitive energy ($\frac{1}{2}CE^2$) at the desired high voltage, the total effective capacitance C must necessarily be small; otherwise the peak voltage E will be low. Internal losses in the choke and ringing of the various coils also detract from the effectiveness of this energy transfer.

Plate chokes which have very high inductance combined with extremely low capacitance and extremely low power loss at sweep frequency, and which keep within competitive limits as to cost and size, have not been available heretofore.

Hence, direct coupling has not been generally regarded by those skilled in the art as a practical solution to the problem of providing adequate horizontal sweep and high voltage at low cost. Despite these obstacles, and contrary to the unfavorable opinions of others, however, we have employed direct coupling to produce a successful sweep system without encountering any of the disadvantages which directly coupled systems generally are believed to have. As a result, we have been able to obtain not only the required horizontal sweep without any difficulty, but also a much higher direct-current output voltage (about fifty percent greater than that obtained heretofore), using only about one-fourth of the power consumed by present commercial sweep systems designed for use in like situations. In accomplishing this we have produced a plate coupling choke of novel design, the details of which are hereinafter described.

An object of the present invention, therefore, is to provide a television sweep system which gives superior performance at lower cost than do the sweep systems heretofore available.

A further object is to provide an improved sweep system for a 10BP4 or similar picture tube using an ordinary receiving type power tube which is capable of furnishing a high voltage output on the order of 11,000 volts, together with a horizontal sweep of 10 inches, and which has low plate dissipation (about 10 watts) in the power tube.

A feature of the invention is the provision of a directly coupled sweep system including a novel coupling choke having an inductance which is high compared with that of the deflection coils and also having an extremely low capacitance which does not appreciably affect the return time of the horizontal sweep.

Another feature is the provision of a directly coupled sweep system including a novel high-inductance coupling choke designed to have a power factor much lower than that of conventional plate chokes.

Still another feature is the provision of an improved, economical, directly coupled sweep system having a high-inductance coupling choke and a rectifier arranged and interconnected in such relation as to furnish a rectified voltage of extremely high value.

The foregoing and other objects, features and advantages of the invention will be apparent from the following description thereof taken in connection with the accompanying drawings, wherein.

In practicing the invention, the horizontal deflection coils of an electromagnetic picture tube are coupled directly to the power tube in the horizontal sweep system of the receiver. Plate current is fed to the power tube partly through a portion of a high-inductance choke and partly through a damper tube connected to a lower voltage point. The plate choke is arranged as an auto-transformer having a portion of its turns in the plate circuit of the power tube. A diode arranged in series with this choke serves to rectify the high voltage induced in the choke during the retrace periods of the picture tube, and the rectified high voltage is applied to the high-voltage anode of the tube. The choke has a core constructed of improved low-loss material having an extremely high permeability. Consequently, a comparatively small number of turns is required on the choke to obtain the required inductance, thereby greatly reducing the objectionable distributed capacitance and coil losses which otherwise would exist in the high voltage part of the choke winding. The other portions of the sweep system likewise are designed with a view to minimizing stray capacitance and power losses. Because of the extremely low capacitance of the system, together with the high inductance and low power factor of the choke, the system operates with extraordinary efficiency and furnishes a high voltage which is much greater than that of any conventional sweep system.

Figures 1, 6:
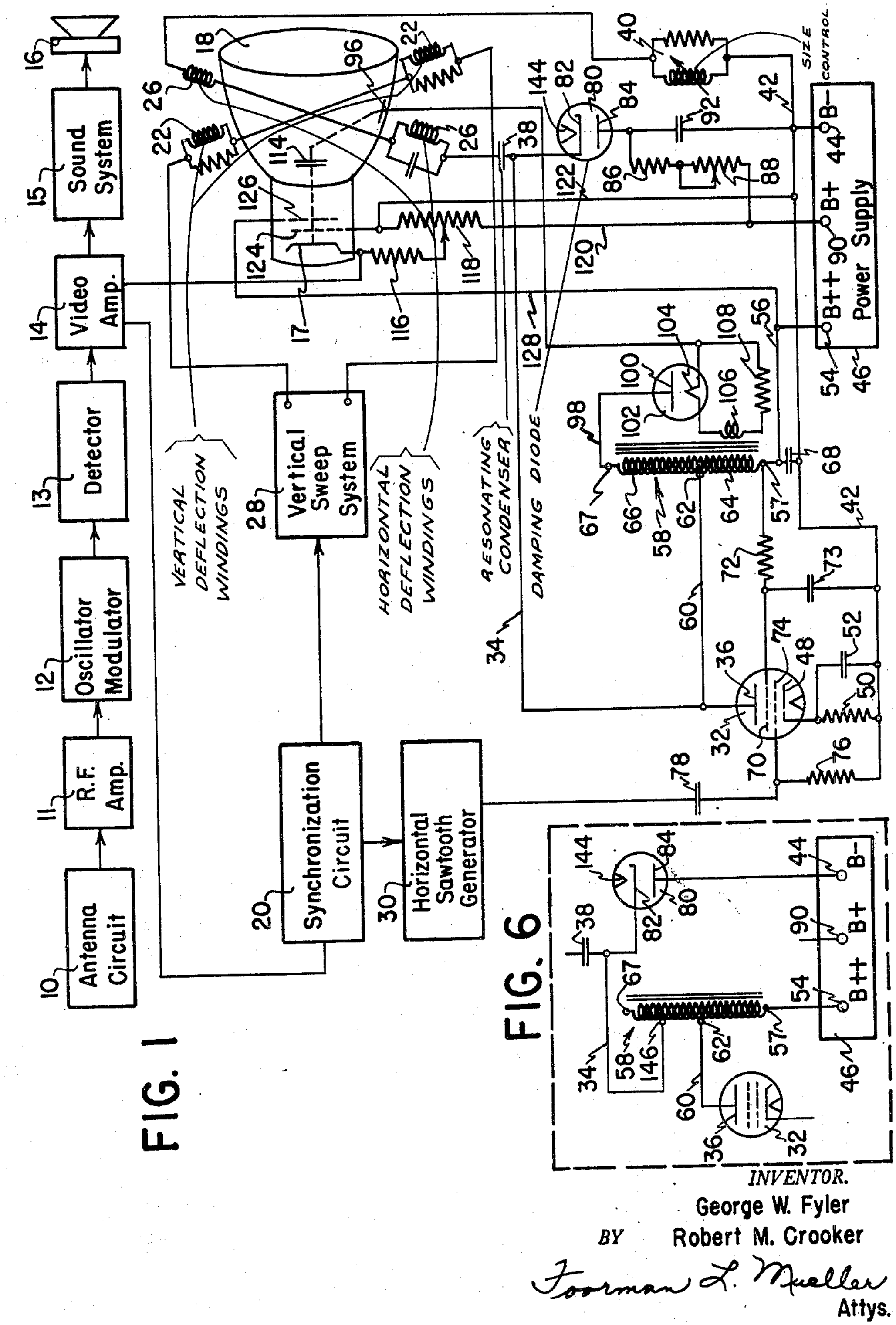
Fig. 1 is a schematic illustration of a television receiver embodying the invention.
Fig. 6 is a partial schematic view showing a modification of the system illustrated in Fig. 1.
Figure 3:
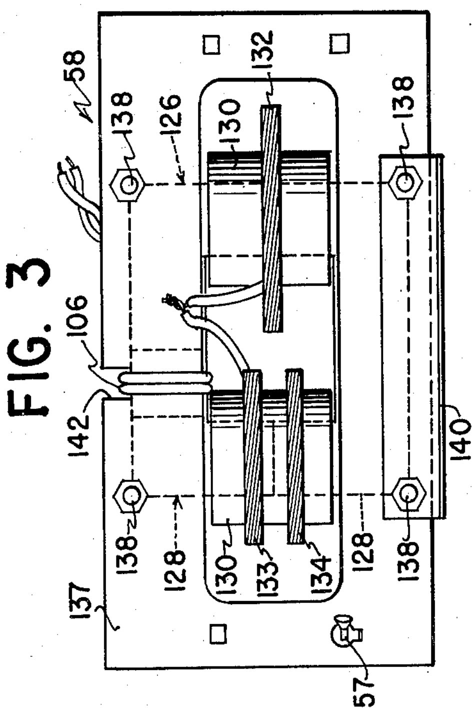
Figs. 2 and 3 are front and rear elevational views of a high-inductance coupling choke used in the sweep system of the receiver shown in Fig. 1.

A typical television receiver in which the present invention may be utilized is illustrated schematically in Fig. 1. The lettered blocks indicate the manner in which a television signal is received. After passing through the antenna circuit 10, the signal is amplified in the radio frequency amplifier 11 and is fed to the oscillator-modulator stage 12, where it is converted to an equivalent intermediate frequency signal. The latter signal then is detected by the detector 13, the output of which is fed to the video amplifier 14. The audio portion of the signal is separated out and fed to the sound system 15 for reproduction in the loudspeaker 16. The video portion of the signal is applied to the cathode 17 of the television picture tube 18. The synchronization components of the video signal are applied to the synchronization circuit 20, which controls the timing of the horizontal and vertical sweeps of the picture tube 18.

The picture tube 18 is an electromagnetic-deflection type of cathode ray tube (such as a 10BP4) having vertical deflection coils 22 and horizontal deflection coils 26. These deflection coils are mounted upon a magnetic yoke (not shown) which surrounds the envelope of the picture tube 18. The vertical deflection coils 22 are connected in circuit with the vertical sweep system 28 of the receiver, which system is controlled in its operation by the synchronization circuit 20. The vertical sweep system 28 may be of any standard type. The synchronization circuit 20 also controls the horizontal sawtooth generator 30 in the horizontal sweep system, which generator produces a sawtooth voltage wave that excites a power tube 32 for effecting the horizontal sweeps or traces of the electron beam in the picture tube 18.

The output of the power tube 32 is applied to the horizontal deflection coils 26 of the picture tube 18. In accordance with the present invention, one terminal of the pair of coils 26 is coupled through a capacitor 38 and a conductor 34 to the plate 36 of the power tube 32. The other end of the pair of coils 26 is connected through a size control device 40 to a bus 42 which leads to the negative terminal 44 of a power supply 46. The cathode 48 of the power tube 32 also is connected to the negative bus 42 through a biasing resistor 50 and a bypass capacitor 52.

The power supply 46 has a terminal 54 at which the maximum positive voltage furnished by this power supply is available. This terminal 54 is connected by a conductor 56 to one terminal 57 of a coupling choke 58. The plate 36 of the power tube 32 is connected by a conductor 60 to a tap 62 on the winding of the choke 58. The portion 64 of the choke winding intermediate the tap 62 and the terminal 57 contains (in the present instance) approximately one-fourth of the total number of turns in the choke winding, the remainder of the turns being contained in that portion of the choke winding designated 66 intermediate the tap 62 and terminal 67. The windings 64 and 66 together constitute an auto-transformer with a transformation ratio of 4:1, the purpose of which will be explained presently.

The plate 36 of tube 32 thus is supplied with positive potential from the power supply terminal 54 through the portion 64 of the choke 58. A by-pass capacitor 68 connected between the conductor 56 and the negative bus 42 affords a path for alternating current at sweep frequency. The screen grid 70 of the power tube 32 is connected by a dropping resistor 72 and the conductor 56 to the positive terminal 54 of the power supply 46, with a bypass capacitor 73 between the grid 70 and the negative or B— bus 42.

The control grid 74 of the power tube 32 is coupled to the sawtooth voltage generator 30 by the resistor 76 and a capacitor 78. The generator 30 drives the power tube 32 as a class C amplifier, with operation thereof limited to about the latter half of the sawtooth cycle, in a manner consistent with good linearity. The plate 36 draws current through the choke winding 64 in such a manner as to produce a linear sawtooth variation of the current in the horizontal deflection coils 26 of the picture tube 18. The tube 80 is an efficiency diode or damper tube, which is connected to the horizontal sweep circuit for the well known purpose of increasing the sweep amplitude and improving the efficiency of this circuit. Most of the sweep current during the first half of the sawtooth cycle is obtained from the energy which is stored in the inductive components of the sweep circuit. This energy is reversed in sign by a 180° oscillation in the LC circuit during flyback. The diode 80 stops the oscillation and conducts a uniformly diminishing current during the first part of the sweep period. There is some overlapping and curvature of both the end of the damping tube current and the start of the sweep tube current, which are controlled by the damper control 88. This provides a resultant sweep current characteristic having good linearity over the entire sweep period.

The diode 80 has an indirectly heated cathode 82 which is coupled to the horizontal coils 26 by the capacitor 38. The plate or anode 84 is connected through a fixed resistor 86 and the adjustable resistor 88 to a positive terminal 90 of the power supply 46, which terminal furnishes a substantially lower voltage than that available at the terminal 54. The plate 84 also is bypassed by a 0.1 microfarad capacitor 92 to the negative bus 42. The diode 80 becomes conductive as the voltage on its cathode 82 becomes negative with respect to its anode 84, thus preventing the occurrence of ringing and providing linear sweep. The current passing through the horizontal coils 26 is influenced both by the power tube 32 and the damper tube 80, as explained above, and the net result of this interaction is to provide a linearly varying sawtooth current having a relatively wide range of variation.

The high voltage anode 96 of the picture tube 18 must be supplied with an extremely high positive potential for satisfactory operation of the picture tube. One of the chief difficulties confronting designers of television receivers is to find an economical way to provide this high potential. Generally this is accomplished by utilizing the energy which is stored in the magnetic field of the horizontal deflection coils 26. During each forward sweep of the electron beam, as it traces a line of the picture on the viewing screen of the tube 18, a considerable amount of energy is stored in the magnetic field of the coils 26. During the succeeding retrace interval, which is very brief, this energy is released, and it is common practice to utilize this released energy for obtaining the high voltage required by the anode 96. Prior systems, however, have failed to furnish as high a voltage as desired in many instances. In many receivers (10-inch sets, for example) the picture tube requires a high-voltage anode potential of around 11,000 volts for best operation, whereas the standard sweep systems have been able to furnish only about 8,000 volts. The use of the lower voltage in a 10-inch picture tube would entail a considerable sacrifice in the quality of the picture displayed by the tube.

The present invention overcomes these difficulties by providing a system which utilizes the choke 58 in place of the conventional transformer to energize the high voltage power supply. In conventional practice the horizontal deflection coils are connected to the secondary winding of a transformer, and the plate of the power tube is connected to the primary of this transformer, with the primary and secondary windings being magnetically coupled but otherwise isolated from each other. In the present instance, however, the pair of coils 26 is connected directly to the plate 36 of the power tube 32, and it is in parallel with the portion 64 of the choke 58 insofar as sweep-frequency currents are concerned. The portion 64 of the choke winding may be considered as the primary of an auto-transformer, the secondary of which comprises both of the winding portions 64 and 66. During the horizontal retrace intervals of the picture tube 18, the energy largely stored in the magnetic field of the coils 26 is utilized to produce a sine wave voltage of extremely high magnitude in the choke 58.

The high-voltage terminal 67 of the choke 58 is connected by a conductor 98 to the plate 100 of a high-voltage diode 102. Current for heating the filamentary cathode 104 of this diode is furnished by an auxiliary secondary winding 106, which consists of a few turns wound on the core of the choke 58. A current-limiting resistor 108 is connected in series with the secondary winding 106 and the cathode 104. The cathode 104 is connected by a conductor 110 to the anode 96 of the picture tube 18. The anode 96 is coupled to the cathode 17 of the picture tube 18 through a suitable capacitive coupling schematically represented as a capacitor 114, which in the present instance consists of the external and internal picture tube coatings on the tube envelope. The cathode 17 is connected by a resistor 116 to the adjustable contact of a brightness control potentiometer 118. The fixed terminals of this potentiometer 118 are connected respectively by conductors 120 and 122 to the positive terminal 90 and the negative terminal 44 of the power supply 46. The conductor 122 also connects the first grid 124 of the picture tube 18 to the negative terminal 44. The second grid 126 of the tube 18 is connected to the power supply terminal 54 by a conductor 128.

As the high pulse voltage is induced in the choke 58 during the retrace intervals, it is rectified by the diode 102, and this rectified voltage is utilized for charging the capacitor 114 to a high direct-current potential. In a commercial television receiver embodying the circuits shown in Fig. 1, we have been able to obtain an anode potential of 11,000 volts, using a power tube 32 of an ordinary receiving type, such as 6BQ6. The power consumed by the system is about 10 watts, as compared with 40 watts used in prior commercial sweep systems for the same purpose.

The choke 58 is of very inexpensive, unique construction, the details of which are shown in Figs. 2 to 5. One of the principal obstacles to designing a choke for use in a system as shown in Fig. 1 is the problem of eliminating leakage inductances and reducing capacitance effects while at the same time providing a sufficiently high effective inductance. The power factor of the choke also must be extremely low. These conditions are fulfilled in the present instance by employing a core 126, Figs. 4 and 5, which is made of a very low-loss material having extremely high premeability. Core materials of this character are available commercially and are known by various names such as "Ceramag" and "Ferramic." These materials are crystalline chemical compositions of various metallic oxides having ferromagnetic properties and also resembling ceramic materials in some respects, but with very high permeability and low losses at the high frequencies employed.

Figure 5:
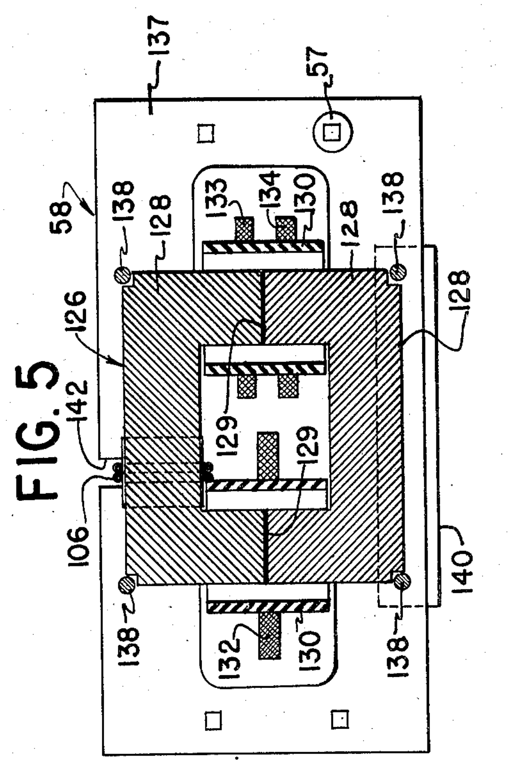
Fig. 5 is a sectional view taken on the line 5—5 of Fig. 4.
Figure 2:
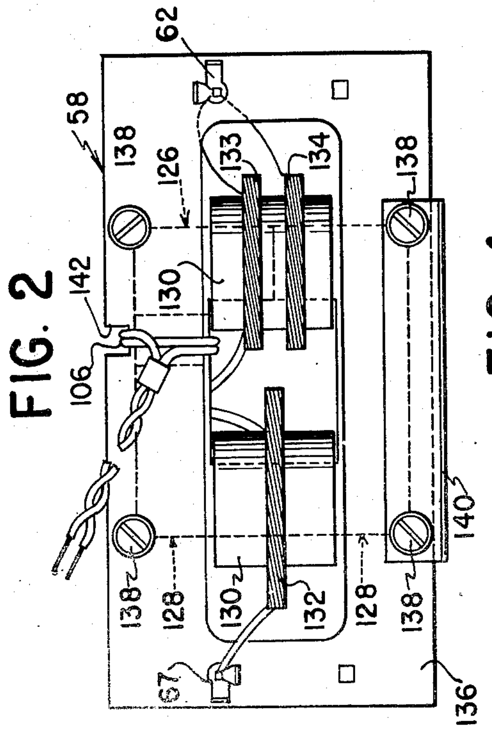
Figure 4:
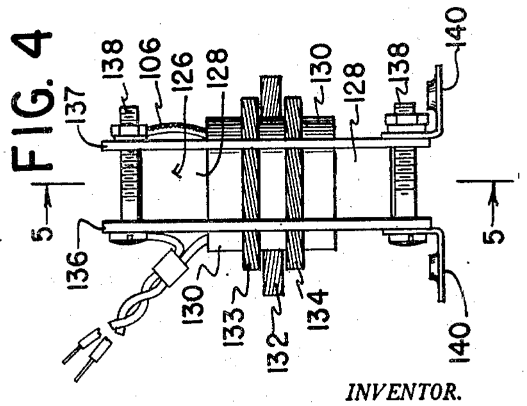
Fig. 4 is an end elevational view of the choke.

As shown best in Fig. 5, the core 126 consists of two complementary U-shaped pieces 128 which are cemented together at their ends to provide a rectangular core structure. The cemented joints have paper spacers 129 to provide definite gaps of about 7 mils in the magnetic circuit, similar to those used in laminated cores where D. C. is present in the coil winding for maximizing the efficiency of choke operation. This has been found to improve the "Q" of the choke without a substantial loss of effective permeability. Cylindrical coil forms 130 for ease in winding respectively enclose the opposite legs of the core 126, and various coils 132, 133 and 134 are mounted on the coil forms 130. These coils are electrically interconnected in series with each other to provide a continuous winding for the choke 58. Preferably the coils are roll-dipped in wax to provide good insulation against breakdown between coils. Rectangular insulating plates 136 and 137 are disposed on opposite sides of the core 126 and are secured together by bolts 138, these plates having rectangular openings therein to afford clearance for the coils. Brackets 140 are secured to the bottom portions of the plates 136 and 137 for mounting the choke 58 on the chassis of the television receiver. The auxiliary filament winding 106 is wound around the upper leg of the core 126 and the adjacent portions of the insulating plates 136 and 137, which plates are notched as indicated at 142 to accommodate the winding 106.

Terminal lugs 57, 62 and 67 (respectively corresponding to the like-numbered terminals of the choke 58, Fig. 1) are mounted on the insulating plates 136 and 137 and are soldered to leads from the various coils 132, 133 and 134. The coils 132 and 133 together constitute the major portion 66 of the choke secondary winding, Fig. 1, with the complete secondary winding consisting of the coils 132, 133 and 134 in series. The coil 134 alone corresponds to the choke primary 64, Fig. 1. This primary coil 134, in the illustrated choke construction, has 500 turns of No. 34 cam .188". The secondary coil 133 is of identical construction and is closely coupled to the primary coil 134 to reduce leakage inductance and ringing. The secondary coil 132 has 1000 turns of No. 36 cam .140". This greater number of turns reduces the tendency for corona to form from the inside turns. The wire of which the coils are formed is enamel coated with nylon serving. All coils are tightly wound on a universal coil winder.

The design of the choke 58 is influenced by the amount of inductance in the deflection coils, the horizontal picture size, the high voltage required, the return time requirement and the characteristics of the power tube 32. With a required 10-inch sweep and 11,000 volts at the output of the high voltage power supply, and with 40 millihenries of inductance in the deflection coils, satisfactory results are obtained when the inductance of the choke primary 64 is approximately 100 millihenries, and the ratio of the total choke turns (secondary) to the choke primary turns is 4:1. The total capacitance which is coupled both directly and by reflection into the plate circuit of tube 32 by the choke 58 must be small enough to keep the horizontal return time within the allowable limit. The amount of reflected capacitance can be reduced by lowering the turns ratio, but this requires a corresponding increase in plate voltage to obtain the same high voltage. With a small power tube of the type that we propose to use, the ratio of 4:1 has been found to be the best value.

The illustrated choke construction, Figs. 2–5, provides the required high inductance and low capacitance that are needed under the conditions which the choke must meet in service. The overall dimensions of this choke assembly are approximately 6 inches by 3 inches by 2 inches. Due to the extremely high core permeability, the coils can be made very small, with ample spacing between them and low distributed capacitance. The arrangement of the coils in the manner shown prevents undesirable ringing of individual coils, particularly in the secondary side which is not controlled by the damper tube 80. The total capacitance introduced into the plate circuit of the power tube 32 is less than 125 micromicrofarads. This, together with the low power factor of the choke and the small consumption of power by the damper tube 80, enables a high voltage of 11,000 volts and a 10-inch sweep to be achieved easily and economically, using only about 10 watts of power. Cost savings of from $4 to $5 per receiver have been effected by the use of this sweep system.

The circuit elements associated with the choke 58 likewise are designed with a view to minimizing all stray capacitances and power losses. This is true particularly of the damper tube 80, which is of small size and is connected to the low-voltage terminal 59 of the power supply 46. The tube 80 has low capacitance and does not consume as much power as damper tubes ordinarily do. Additional reduction of capacitance may be obtained by using a damper tube in which the heater 144 is sufficiently well insulated from the cathode 82 so that the heater may safely be grounded. This eliminates the special heater transformer ordinarily used, which contributes some of the stray capacitance.

Fig. 6 illustrates a slight modification of the circuit shown in Fig. 1 to further reduce the stray capacitance and power consumption of the damper tube 80. In this instance, the plate 36 of the power tube 32 is connected to the tap 62 on the choke 58, as before, but the conductor 34 which leads to the cathode 82 of the damper tube 80 and to the horizontal deflecting coils 26 (to which the conductor 34 is coupled through the medium of the capacitor 38) is now connected to a tap 146 on the choke 58 which is between the tap 62 and the high-voltage terminal 67 of the choke 58. The plate 84 of the damper tube 80 is connected directly to the B— terminal 44 of the power supply 46. This arrangement eliminates the damper control 88 of Fig. 1, and the bypass capacitor 92, thereby saving the power ordinarily consumed in the bleeder resistances 86 and 88. The inductance of the horizontal deflection coils is made slightly larger in this case to obtain the correct plate load impedance for the power tube 32.

A factor contributing to the attainment of good picture size is the boosting effect of the capacitor 38 (Fig. 1), which is in series with the horizontal deflecting coils 26. This capacitor is designed to produce a condition approaching series resonance at the fundamental line frequency, without substantially affecting the linearity of the horizontal sweep. This adds a desirable increment to the horizontal sweep. Good control of the horizontal size is afforded by the illustrated size control 40, which varies the effective inductance of the deflection coils 26. This size control is placed directly in series with the deflection coils, as explained above.

While there have been disclosed what are considered at present to be the preferred embodiments of the invention, it will be understood that various modifications thereof may be made within the true spirit and scope of the invention as set forth in the appended claims.

We claim:

1. A television sweep system for energizing electromagnetic deflection coils associated with a television picture tube and for providing a high potential for the anode of the picture tube including in combination, a direct current power supply including first and second terminals which provide potentials positive with respect to a reference potential, a power tube having at least a cathode, a plate and a grid, means for applying a sawtooth voltage wave between said cathode and said grid of said power tube, a high impedance choke having an intermediate tap thereon, means connecting a portion of said choke between said first terminal of said power supply and said plate of said power tube for applying a positive potential thereto, means connecting said deflection coils to said intermediate tap on said choke, a damper tube having a cathode connected to said tap on said choke and a plate coupled to said second terminal of said power supply for applying energy from said power supply to said power tube, and rectifier means coupled to said choke and to said anode of said picture tube for providing a high direct current voltage for said anode of said picture tube.

2. A television sweep system for energizing electromagnetic deflection coils associated with a television picture tube and for providing a high potential for the anode of the picture tube including in combination, a direct current power supply including first and second terminals which provide potentials positive with respect to a reference potential, a power tube having at least a cathode, a plate and a grid, means for applying a sawtooth voltage wave between said cathode and said grid of said power tube, a high impedance choke including a substantially closed core structure having a pair of spaced legs with a primary winding on one of said legs and a series connected high voltage winding on the other one of said legs, said core having very high permeability so that said windings have large inductance with a relatively small number of turns and the distributed capacity thereof is relatively small, means connecting said primary winding of said choke between said first terminal of said power supply and said plate of said power tube for applying a positive potential thereto, a damper tube having a plate coupled to said second terminal of said power supply and a cathode connected to said plate of said power tube for applying energy from said power supply to said power tube, means connecting said deflecting coils between said cathode of said damper tube and said point of reference potential, and rectifier means coupled to said choke and to said anode of said picture tube for providing a high direct current voltage for said anode of said picture tube.

3. A television sweep system for energizing electromagnetic deflection coils associated with a television picture tube and for providing a high potential for the anode of the picture tube including in combination, a direct current power supply including first and second terminals which provide potentials positive with respect to a reference potential, a power tube having at least a cathode, a plate and a grid, means for applying a sawtooth voltage wave between said cathode and said grid of said power tube, a high impedance choke including a core having a pair of spaced legs with a primary winding on one of said legs and a high voltage winding connected in series with said primary winding on the other one of said legs, means connecting said primary winding of said choke between said first terminal of said power supply and said plate of said power tube for applying a positive potential thereto, a damper tube having a plate coupled to said second terminal of said power supply and a cathode coupled to said plate of said power tube for applying energy from said power supply to said power tube, means connecting the deflection coils between said cathode of said damper tube and said point of reference potential, and rectifier means coupled to said choke and to the anode of said picture tube for providing a high direct current voltage for said anode of said picture tube.

4. A television sweep system for energizing electromagnetic deflection coils associated with a television picture tube and for providing a high potential for the anode of said picture tube including in combination, a direct current power supply for providing a potential positive with respect to a reference potential, a power tube having at least a cathode, a plate and a grid, means for applying a sawtooth voltage wave between said cathode and said grid of said power tube, a high impedance choke having a portion thereof connected to said plate of said power tube, a diode tube having a cathode connected to a tap on said choke and a plate coupled to said power supply for applying energy from said power supply to said power tube, means connecting said deflection coils between said tap on said choke and said reference potential, and rectifier means coupled to said choke and to said anode of said picture tube for providing a high direct current voltage for said anode of said picture tube.

5. A television sweep system for energizing electromagnetic deflection coils associated with a television picture tube and for providing a high potential for the anode of said picture tube including in combination, a direct current power supply for providing a potential positive with respect to a reference potential, a power tube having at least a cathode, a plate and a grid, means for applying a sawtooth voltage wave between said cathode and said grid of said power tube, high impedance choke means having serially connected windings with one of said windings being connected to said plate of said power tube, a diode tube having a cathode connected to a tap on said windings and a plate coupled to said power supply for applying energy from said power supply to said power tube, means connecting said deflection coils to said tap on said windings, and rectifier means coupled to said windings for rectifying the pulses produced across said entire windings and thereby providing a high direct current voltage for said anode of said picture tube.

6. A television sweep system for energizing electromagnetic deflection coils associated with a television picture tube and for providing a high potential for the anode of said picture tube including in combination, a direct current power supply for providing a potential positive with respect to a reference potential, a power tube having at least a cathode, a plate and a grid, means for applying a voltage wave of sawtooth form between said cathode and said grid of said power tube, high impedance choke means serving as an auto transformer and having a plurality of series connected portions with terminals defining the same, means connecting said plate of said power tube to a terminal of said choke means for producing a sawtooth current wave therein, a diode damper tube having a cathode connected to a terminal of said choke means and a plate connected to said power supply for applying energy from said power supply to said power tube, means connecting said deflection coils across one portion of said choke means, and rectifier means connected to an end terminal of said choke means and to said anode of said picture tube for rectifying the alternating voltages in said entire choke means to provide a high direct current voltage for said anode of said picture tube.

7. A television sweep system for energizing electromagnetic deflection coils associated with a television picture tube and for providing a high potential for the anode of said picture tube including in combination, direct current power supply means for providing a first potential positive with respect to a reference potential, said power supply means including condenser means across which a positive potential is developed which is higher than said first potential, a power tube having at least a cathode, a plate and a grid, means for applying a voltage wave of sawtooth wave form between said cathode and said grid of said power tube, high impedance choke means having a plurality of series connected portions and forming an auto transformer with one portion thereof serving as the primary and the entire choke means serving as the secondary, means connecting said plate of said power tube to said primary portion of said choke means for producing a sawtooth current wave in said choke means, said condenser means being connected to the end terminal of said primary portion to apply potential through said primary portion to said power tube, a diode damper tube having a cathode connected to said primary portion of said choke means and a plate coupled to said first potential of said power supply for applying energy from said power supply to said power tube, means connecting said deflection coils in parallel across at least a part of said primary portion of said choke means, and rectifier means connected across said entire choke means and to said anode of said picture tube for providing a high direct current voltage for said anode of said picture tube.

8. A television sweep system for energizing electromagnetic deflection coils associated with a television picture tube and for providing a high potential for the anode of said picture tube including in combination, a direct current power supply for providing a first potential positive with respect to a reference potential, a power tube having at least a cathode, a plate and a grid, means for applying a voltage wave of sawtooth form between said cathode and said grid of said power tube, high impedance choke means having a plurality of series connected portions and having end terminals and at least one intermediate terminal between said portions, means connecting said plate of said power tube to one of said terminals of said choke means for producing a sawtooth current wave in said choke means, condenser means across which a positive potential greater than said first potential is developed, said condenser means being connected between one of said end terminals of said choke means and said reference potential of said power supply, a diode damper tube having a cathode connected to an intermediate terminal of said choke means and a plate coupled to said first positive potential of said power supply for applying energy from said power supply to said power tube, means connecting said deflection coils to said intermediate terminal across one of said portions of said choke means, and rectifier means coupled to said end terminal of said choke means opposite to said one end terminal and to said anode of said picture tube for providing a high direct current voltage for said anode of said picture tube.

9. A television sweep system for energizing electromagnetic deflection coils associated with a television picture tube and for providing a high potential for the anode of the picture tube including in combination, direct current power supply means including first and second terminals which provide potentials positive with respect to a reference potential, a power tube having at least a cathode, a plate and a grid, means for applying a voltage wave of sawtooth wave form between said cathode and said grid of said power tube, high impedance choke means having series connected portions and an intermediate tap thereon, means connecting a portion of said choke means between said first terminal of said power supply means and said plate of said power tube for applying a positive potential thereto, means connecting said deflection coils to said intermediate tap on said choke means, a damper tube having a cathode connected to said intermediate tap on said choke means and a plate coupled to said second terminal of said power supply for applying energy from said power supply to said power tube, and rectifier means coupled to said choke means and to said anode of said picture tube for providing a high direct current voltage for said anode of said picture tube.

10. A television sweep system for energizing electromagnetic deflection coils associated with a television picture tube and for providing a high potential for the anode of the picture tube including in combination, direct current power supply means including condenser means across which a first potential is developed which is positive with respect to a reference potential and a terminal at which a potential is developed which is lower than said first potential and which is also positive with respect to said reference potential, a power tube having at least a cathode, a plate and a grid, means for applying a voltage wave of sawtooth wave form between said cathode and said grid of said power tube, high impedance choke means including a substantially closed core structure having a pair of spaced legs with primary winding means on one of said legs and series connected high voltage winding means on the other of said legs, said core structure having very high permeability so that said windings have large inductance with a relatively small number of turns and the distributed capacity thereof is relatively small, means connecting said primary winding means of said choke means between said condenser means and said plate of said power tube for applying a positive potential thereto, a diode damper tube having a plate coupled to said second terminal of said power supply means and a cathode connected to said primary winding means of said choke means for supplying energy from said power supply means to said power tube, means connecting said deflecting coils across at least a portion of said primary winding means of said choke means, and rectifier means coupled to said high voltage winding means of said choke means and to said anode of said picture tube for providing a high direct current voltage for said anode of said picture tube.

11. A television sweep system for energizing electromagnetic deflection coils associated with a television picture tube and for providing a high potential for the anode of the picture tube including in combination, direct current power supply means for providing a potential which is positive with respect to a reference potential, a power tube having at least a cathode, a plate and a grid, means for applying a voltage wave of sawtooth wave form between said cathode and said grid of said power tube, high impedance choke means serving as an auto transformer and including a substantially closed core structure having a pair of spaced legs with primary winding means on one of said legs and series connected high voltage winding means on the other one of said legs, said core having very high permeability so that said windings have large inductance with a relatively small number of turns and the distributed capacity thereof is relatively small, means connecting said primary winding means of said choke means to said plate of said power tube for providing a sawtooth current wave in said choke means, a diode damper tube having a plate coupled to said positive potential of said power supply means and a cathode connected to said primary winding means of said choke means for applying energy from said power supply means to said power tube, means connecting said deflecting coils across at least a portion of said primary winding means, with said deflecting coils being connected to said cathode of said damper tube, and rectifier means coupled to said high voltage winding means of said choke means and to said anode of said picture tube for providing a high direct current voltage for said anode of said picture tube.

12. A sweep system as set forth in claim 11, wherein said diode damper tube has a heater insulated from said damper tube cathode sufficiently to permit grounding of said heater.

13. A television sweep system for periodically energizing an electromagnetic beam deflection means associated with a picture tube, such system comprising current supply means including a power tube adapted to supply a periodically varying current wave to the deflection means of the picture tube, said power tube having output electrode means coupled to the deflection means whereby said current wave is conducted without transformation thereof from said power tube to the deflection means, and a capacitor connected in series with said output electrode means and the deflection means to increase the variations in amplitude of the current wave, said capacitor having a capacitance such as to produce a condition approaching series resonance in conjunction with the inductance of the deflection means at the fundamental frequency of the current wave.

14. A television sweep system for periodically energizing an electromagnetic beam deflection means associated with a picture tube, such system comprising current supply means including a power tube adapted to supply a periodically varying current wave to the deflection means of the picture tube, said power tube having output electrode means coupled to the deflection means whereby said current wave is conducted without transformation thereof from said power tube to the deflection means, a capacitor connected in series with said output electrode means and the deflection means to increase the variations in amplitude of the current wave, said capacitor having a capacitance such as to produce a condition approaching series resonance in conjunction with the inductance of the deflection means at the fundamental frequency of the current wave, and a size control including a variable inductance connected in series with the deflection means and said output electrode means for limiting the variations in amplitude of the current wave to a desired amount.

15. A television sweep system for energizing electromagnetic deflection coils associated with a picture tube, such system comprising a power supply having negative and positive terminals, a choke having a first terminal connected to said positive power supply terminal, a first tap on said choke, a power tube having a cathode connected to said negative power supply terminal and a plate connected to said first tap, a sawtooth voltage source for driving said power tube, a second tap on said choke, means coupling said second tap to the deflection coils of the picture tube, a damper tube having a cathode connected to said second tap and an anode connected to said negative power supply terminal, a second terminal on said choke, a rectifier means connected to said second terminal for utilizing pulse voltages induced in said choke to develop a high direct-current operating potential for the picture tube.

16. A sweep system as set forth in claim 15, wherein said damper tube has a heater sufficiently well insulated from said damper tube cathode to permit the grounding of said heater.

GEORGE W. FYLER.
ROBERT M. CROOKER.

(References on following page)

REFERENCES CITED

The following references are of record in the file of this patent:

UNITED STATES PATENTS

| Number | Name | Date |
|---|---|---|
| 2,074,495 | Vance | Mar. 23, 1937 |
| 2,212,217 | White et al. | Aug. 20, 1940 |
| 2,223,990 | Holmes | Dec. 3, 1940 |
| 2,360,697 | Lyman | Oct. 17, 1944 |
| 2,397,150 | Lyman | Mar. 26, 1946 |
| 2,430,738 | Schwennesen | Nov. 11, 1947 |
| 2,440,418 | Tourshou | Apr. 27, 1948 |
| 2,443,030 | Foster | June 8, 1948 |
| 2,451,026 | Friend | Oct. 12, 1948 |
| 2,470,197 | Torsch | May 17, 1949 |
| 2,476,854 | Friend | July 19, 1949 |
| 2,482,737 | Shaw | Sept. 20, 1949 |
| 2,490,743 | Sziklai | Dec. 6, 1949 |
| 2,500,766 | Obert et al. | Mar. 14, 1950 |
| 2,536,838 | Clark | Jan. 2, 1951 |
| 2,536,839 | Clark et al. | Jan. 2, 1951 |
| 2,536,857 | Schade | Jan. 2, 1951 |
| 2,554,925 | Schlesinger | May 29, 1951 |
| 2,555,827 | Tourshou et al. | June 5, 1951 |
| 2,555,829 | Barco | June 5, 1951 |
| 2,555,831 | Tourshou | June 5, 1951 |
| 2,565,392 | Neuwirth | Aug. 21, 1951 |